United States Patent Office 3,061,617
Patented Oct. 30, 1962

3,061,617
SAPONIFICATION OF ESTERS OF STEROIDS
Gérard Nomine, Noisy-le-Sec (Seine), and Robert Bucourt, Villiers-le-Bel (Seine and Oise), France, assignors to Roussel-UCLAF, Paris, France, a corporation of France
No Drawing. Filed Jan. 3, 1962, Ser. No. 164,136
Claims priority, application France Jan. 11, 1961
5 Claims. (Cl. 260—397.4)

This invention relates to a novel method for the saponification of carboxylic acid esters of 13β-alkyl-Δ⁴-gonene-17β-ol-3-ones wherein the carboxylic acid is an organic carboxylic acid having 1 to 18 carbon atoms. The invention also relates to novel intermediates formed in the saponification process. The direct saponification of the said esters is very difficult and gives only mediocre yields.

It is an object of the invention to provide a novel process for the saponification of carboxylic acid esters of 13β-alkyl-Δ⁴-gonene-17β-ol-3-ones in good yields.

It is another object of the invention to obtain novel intermediates for the saponification of the carboxylic acid esters of 13β - alkyl - Δ⁴ - gonene - 17β - ol - 3 - ones and particularly (a) The benzoate of 3-ethoxy-13β-n-propyl-Δ³,⁵-gonadiene-17β-ol (b) 3-ethoxy-13β-n-propyl-Δ³,⁵-gonadiene-17β-ol These and other objects and advantages of the invention will become obvious from the following detailed description.

The process of the invention comprises reacting a carboxylic acid ester of 13β-alkyl-Δ⁴-gonene-17β-ol-3-ones to form an enol ether, preferably the carboxylic acid ester of 3-lower alkoxy-13β-alkyl-Δ³,⁵-gonadiene-17β-ol, although other enol ethers such as the tetrahydropyranyl-oxy may be formed, reacting the latter under alkaline conditions to form the saponified enol ether, preferably 3-lower alkoxy-13β-alkyl-Δ³,⁵-gonadiene-17β-ol, hydrolyzing the latter under acid conditions to form 13β-alkyl-Δ⁴-gonene-17β-ol-3-ones and recovering the latter.

A preferred mode of the process of the invention comprises reacting a carboxylic acid ester of 13β-alkyl-Δ⁴-gonene-17β-ol-3-ones with ethyl orthoformate in the presence of a small amount of sulfuric acid to form the carboxylic acid ester of 3-ethoxy-13β-alkyl-Δ³,⁵-gonadiene-17β-ol, saponifying the latter in the presence of an alkali metal base in a lower alkanol such as ethanol or methanol to form 3-ethoxy-13β-alkyl-Δ³,⁵-gonadiene-17β-ol, reacting the latter with an organic or inorganic acid such as hydrochloric acid to form 13β-alkyl-Δ⁴-gonene-17β-ol-3-ones and recovering the latter. The reaction scheme is illustrated in Table I.

TABLE I

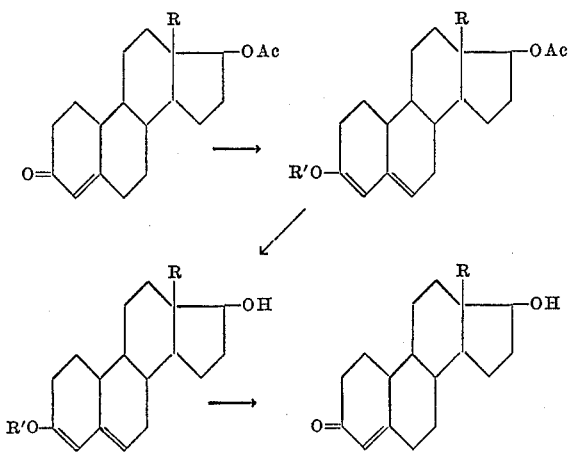

wherein R is an alkyl radical having 1 to 18 carbon atoms, R' is a lower alkyl radical and Ac is an acyl radical of an organic carboxylic acid having 1 to 18 carbon atoms.

The carboxylic acid esters of the 13β-alkyl-Δ⁴-gonene-17β-ol-3-ones are more fully described in the copending, commonly assigned United States application Serial No. 96,062, filed January 19, 1961. The 13β-alkyl group may be an alkyl radical having 1 to 18 carbon atoms. The carboxylic acids may be alkanoic acids, alkenoic acids, cycloalkyl alkanoic acids, aryl alkanoic acids or aryl carboxylic acids as described in said copending application.

The carboxylic acid esters of the 13β-alkyl-Δ⁴-gonene-17β-ol-3-one may be prepared according to the process disclosed in U.S. patent application Serial No. 96,062 and is illustrated by the steps comprising reacting an alkyl halide with 6 - methoxy - 3,4 - dihydronaphthyl - (2,1) - isoxazole followed by hydrogenation to form 2-cyano-2-n-propyl - 15 - methoxycarbonyl-Δ⁵,⁷,⁹,¹⁴-des A-gonatetraene-17-one, reacting the latter with an alkali metal borohydride to form 5-methoxy-13β-n-propyl-15-carboxy-Δ⁵,⁷,⁹,¹⁴-des A-gonatetraene-17β-ol, heating the latter under acid conditions to form 5-methoxy-13β-n-propyl-Δ⁵,⁷,⁹,¹⁴-des A-gonatetraene-17β-ol, reducing the latter to form 5-methoxy - 13β - n - propyl-Δ⁵,⁷,⁹-des A-gonatriene-17β-ol, reacting the latter with sodium in ammonia to form 13β-n-propyl-Δ⁹-des A-gonene-17β-ol-5-one, esterifying the latter with benzoic acid to form 13β-n-propyl-17β-benzoyloxy-Δ⁹-des A-gonene-5-one, reacting the latter with pyrrolidine to form 5-pyrrolidyl-13β-n-propyl-17β-benzoyloxy-Δ⁵⁽¹⁰⁾,⁹⁽¹¹⁾-des A-gonadiene, reacting the latter with a 1,3-dihalo-butene-2 to form 3-halo-13β-n-propyl-17β-benzoyloxy-4,5-seco-Δ²,⁹-gonadiene-5-one, hydrolyzing the latter to form 13β-n-propyl - 17β - benzoyloxy-4,5-seco-Δ⁹-gonene-3,5-dione, reducing the latter to form 13β-n-propyl-17β-benzoyloxy-4,5-seco-gonane-3,5-dione, condensing the latter to form 13β-n-propyl-17β-benzoyloxy-Δ⁴-gonene-3-one and recovering the latter.

In the following example there are described several embodiments to illustrate the invention. However, it should be understood that the invention is not intended to be limited to the specific embodiments.

EXAMPLE

Saponification of the Benzoate of 13β-n-Propyl-Δ⁴-Gonene-17β-Ol-3-One (or 18,19 - Di - Nor - 13β-n-Propyl-Testosterone)

Step A.—1.5 g. of the benzoate of 13β-n-propyl-Δ⁴-gonene-17β-ol-3-one obtained according to the commonly assigned, copending United States patent application Serial No. 96,062, filed January 19, 1961, were introduced into 3 cc. of ethanol. 2.4 cc. of ethyl orthoformate were added and then several drops of sulfuric acid in an ethanol solution were added. The reaction mixture was heated for a period of 10 minutes at 75° C. and then 0.15 cc. of triethylamine were added in order to alkalize the mixture. 7.5 cc. of water were added to the mixture and the mixture was extracted with methylene chloride. The extracts were washed with water, then evaporated to dryness under vacuum. The residue was taken up with 3 cc. of isopropyl ether. The solution was cooled to 0° C., vacuum filtered and washed. 1.015 g. of the benzoate of 3-ethoxy-13β-n-propyl-Δ³,⁵-gonadiene-17β-ol, having a melting point of 154° C., were obtained which was used without further purification for the next step of the synthesis.

This compound is not described in the literature.

Step B.—1 g. of the compound prepared in Step A was introduced into 20 cc. of methanol. 25 cc. of a 10% solution of potassium hydroxide in methanol and 15 cc. of methylene chloride were added. The reaction mixture was heated to reflux under an atmosphere of nitrogen for a period of 4 hours. The mixture was concentrated to a small volume, poured into ice water and the precipitated product was vacuum filtered. 755 mg. of 3-ethoxy-13β-n-propyl-Δ³,⁵-gonadiene-17β-ol were obtained which was utilizable as such in the following step.

This product is not described in the literature.

*Step C.*—250 mg. of the 17β-hydroxylated derivative obtained in Step B were dissolved in a mixture of 25 cc. of methanol and 4.1 cc. of 2% aqueous hydrochloric acid solution. The reaction mixture was allowed to stand under nitrogen atmosphere for a period of 15 hours at room temperature. The methanol was distilled off under vacuum and the residue was extracted with methylene chloride. The extracts after washing with water and drying were evaporated to dryness under vacuum and gave 225 mg. of 13β-n-propyl-Δ⁴-gonene-17β-ol-3-one which was recrystallized from isopropyl ether. The purified product had a melting point of 163° C. and a specific rotation $[\alpha]_D^{20} = +64°$ (c.=0.5% in methanol).

Various modifications of the process of the invention may be made without departing from the spirit or scope thereof and it is to be understood that the invention is to be limited only as defined in the appended claims.

We claim:

1. A process for the preparation of 13β-n-propyl-Δ⁴-gonene-17β-ol-3-one which comprises reacting a carboxylic acid ester of 13β-n-propyl-Δ⁴-gonene-17β-ol-3-one wherein the carboxylic acid ester is an organic carboxylic acid having 1 to 18 carbon atoms selected from the group consisting of alkanoic acids, alkenoic acids, cycloalkyl alkanoic acids, phenyl alkanoic acids and phenyl carboxylic acids with a lower alkyl orthoformate to form the corresponding carboxylic acid ester of 3-lower alkoxy-13β-n-propyl-Δ³,⁵-gonadiene-17β-ol, reacting the latter under alkaline conditions to form 3-lower alkoxy-13β-n-propyl-Δ³,⁵-gonadiene-17β-ol, reacting the latter under acid conditions to form 13β-n-propyl-Δ⁴-gonene-17β-ol-3-one and recovering the latter.

2. The process of claim 1 wherein the carboxylic acid ester of 13β-n-propyl-Δ⁴-gonene-17β-ol-3-one is reacted with ethyl orthoformate to form the carboxylic acid ester of 3-ethoxy-13β-n-propyl-Δ³,⁵-gonadiene-17β-ol.

3. A process for the preparation of 13β-n-propyl-Δ⁴-gonene-17β-ol-3-one which comprises reacting the benzoic acid ester of 13β-n-propyl-Δ⁴-gonene-17β-ol-3-one with ethyl orthoformate to form the benzoic acid ester of 3-ethoxy - 13β - n - propyl-Δ³,⁵-gonadiene-17β-ol, reacting the latter under alkaline conditions to form 3-ethoxy-13β-n-propyl-Δ³,⁵-gonadiene-17β-ol, reacting the latter under acid conditions to form 13β-n-propyl-Δ⁴-gonene-17β-ol-3-one and recovering the latter.

4. The benzoic acid ester of 3-ethoxy-13β-n-propyl-Δ³,⁵-gonadiene-17β-ol.

5. 3-ethoxy-13β-n-propyl-Δ³,⁵-gonadiene-17β-ol.

No references cited.